United States Patent
Liu et al.

(10) Patent No.: US 11,481,948 B2
(45) Date of Patent: Oct. 25, 2022

(54) METHOD, DEVICE AND STORAGE MEDIUM FOR GENERATING ANIMATION GROUP BY SYNTHESIZING ANIMATION LAYERS BASED ON TREE STRUCTURE RELATION BETWEEN BEHAVIOR INFORMATION AND SUB-BEHAVIOR INFORMATION

(71) Applicant: Beijing Dajia Internet Information Technology Co., Ltd., Beijing (CN)

(72) Inventors: Xuan Liu, Beijing (CN); Zhenlong Bai, Beijing (CN); Kaijian Jiang, Beijing (CN); Chao Wang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 202 days.

(21) Appl. No.: 16/935,805

(22) Filed: Jul. 22, 2020

(65) Prior Publication Data
US 2020/0349753 A1 Nov. 5, 2020

(30) Foreign Application Priority Data
Jul. 22, 2019 (CN) .......................... 201910662986.1

(51) Int. Cl.
G06T 13/80 (2011.01)
G06F 9/445 (2018.01)
H04L 65/402 (2022.01)

(52) U.S. Cl.
CPC ................... *G06T 13/80* (2013.01)

(58) Field of Classification Search
CPC ... G06T 19/006; G06T 17/105; G06T 19/003; G06T 13/80; H04L 65/4025; G06F 9/44505
See application file for complete search history.

(56) References Cited

U.S. PATENT DOCUMENTS

| | | | | |
|---|---|---|---|---|
| 2001/0050685 A1* | 12/2001 | Simons | ............ | H04N 21/41407 345/475 |
| 2002/0057890 A1* | 5/2002 | Iwai | ........................ | A63F 13/42 386/230 |
| 2003/0132938 A1* | 7/2003 | Shibao | .................... | G06T 13/00 345/473 |
| 2005/0017976 A1* | 1/2005 | Minakuchi | .............. | G06T 13/20 345/473 |

(Continued)

FOREIGN PATENT DOCUMENTS

| CN | 104517307 A | 4/2014 |
|---|---|---|
| CN | 108810132 A | 11/2018 |

*Primary Examiner* — King Y Poon
*Assistant Examiner* — Vincent Peren
(74) *Attorney, Agent, or Firm* — Burns & Levinson, LLP; Joseph M. Maraia

(57) ABSTRACT

The present disclosure discloses a method, device and storage medium for generating an animation. The method includes: acquiring a configuration file corresponding to a configuration file identifier; determining behavior information and animated resources based on the configuration file; acquiring first animated resources based on first animated resource identifiers in the behavior information; and generating the animation by synthesizing the behavior information and the first animated resources.

11 Claims, 12 Drawing Sheets

(56) References Cited

U.S. PATENT DOCUMENTS

| | | | |
|---|---|---|---|
| 2008/0303828 A1* | 12/2008 | Marchant | G06T 13/00 |
| | | | 345/473 |
| 2011/0090231 A1* | 4/2011 | Heilakka | G06T 13/00 |
| | | | 345/473 |
| 2011/0119332 A1* | 5/2011 | Marshall | A63F 13/12 |
| | | | 709/203 |
| 2013/0083034 A1* | 4/2013 | Mandal | G06T 13/00 |
| | | | 345/473 |
| 2013/0278607 A1* | 10/2013 | Twigg | G06T 13/80 |
| | | | 345/473 |

* cited by examiner

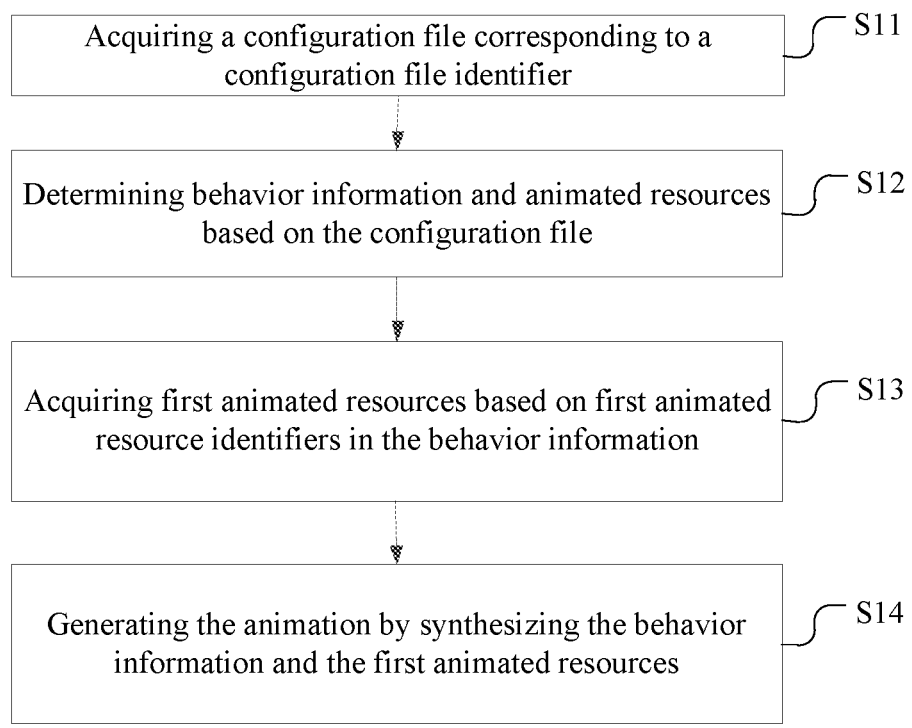

METHOD, DEVICE AND STORAGE MEDIUM FOR GENERATING ANIMATION GROUP BY SYNTHESIZING ANIMATION LAYERS BASED ON TREE STRUCTURE RELATION BETWEEN BEHAVIOR INFORMATION AND SUB-BEHAVIOR INFORMATION

CROSS-REFERENCE TO RELATED APPLICATION

This application is based on and claims priority under 35 U.S.C 119 to Chinese Patent Application No. 201910662986.1, filed Jul. 22, 2019, in the China National Intellectual Property Administration. The entire disclosure of the above application is incorporated herein by reference.

FIELD

The present disclosure relates to the field of data processing, in particular to a method, device and storage medium for generating an animation.

BACKGROUND

With the continuous development of computer technology, network technology and electronic technology, users are more and more accustomed to watching animations on terminal equipment. The effect of animation is achieved by continuous playing of multiple still pictures, and forming sequential images by means of the persistence of vision. With the development of animation technology, animation has been widely used in many fields.

On the Internet, animations are often placed in a certain area of a webpage to highlight certain content, as a way of advertising etc. In electronic products, animations are increasingly used to improve UI (User Interface), develop new functions and improve user experience. For example, animation display is often required on client-side APP (Application) to enrich UI presentation forms and user interaction experiences.

SUMMARY

The present disclosure provides a method, device and storage medium for generating an animation.

According to an embodiment of the disclosure, the disclosure provides a method for generating an animation. The method includes: acquiring a configuration file corresponding to a configuration file identifier; determining behavior information and animated resources based on the configuration file; acquiring first animated resources based on first animated resource identifiers in the behavior information; and generating the animation by synthesizing the behavior information and the first animated resources.

According to an embodiment of the disclosure, the configuration file identifier is determined based on an input instruction or is sent by a network side device.

According to an embodiment of the disclosure, the acquiring the configuration file corresponding to the configuration file identifier includes: acquiring the configuration file based on a corresponding relation between the configuration file identifier and the configuration file in response to that the configuration file identifier is determined based on the input instruction; or receiving the configuration file sent by the network side device in response to that the configuration file identifier is sent by the network side device, where the configuration file is determined by the network side device based on a corresponding relation between the configuration file identifier and the configuration file.

According to an embodiment of the disclosure, the obtaining the animated resources includes: determining configuration information of the animated resources, where the configuration information includes at least one animated resource address and second animated resource identifiers; and downloading the animated resources based on the at least one animated resource address.

According to an embodiment of the disclosure, the method further includes: determining third animated resource identifiers of animated resources downloaded based on the animated resource address based on second animated resource identifiers corresponding to the animated resource address.

According to an embodiment of the disclosure, the generating the animation includes: converting the first animated resources into first animation layers; converting second animated resources into second animation layers, where the second animated resources corresponds to fourth animated resource identifiers included in sub-behavior information, and the sub-behavior information is at least a part of the behavior information; and generating an animation group by synthesizing the first animation layers and the second animation layers based on a tree structure relation between the behavior information and the sub-behavior information.

According to an embodiment of the disclosure, the disclosure provides a method for generating an animation. The method includes receiving a configuration file identifier sent by a terminal; determining a configuration file based on a corresponding relation between the configuration file identifier and the configuration file; determining behavior information and animated resources based on the configuration file; acquiring first animated resources based on first animated resource identifiers in the behavior information; and generating the animation by synthesizing the behavior information and the first animated resources.

According to an embodiment of the disclosure, the method further includes: determining a new configuration file identifier in response to determining that there is a new configuration file; or determining a new configuration file identifier in response to determining that the configuration file is updated.

According to an embodiment of the disclosure, the disclosure provides a device for generating an animation, including a memory and at least one processor. The at least one processor is configured to read and execute instructions stored in the memory to perform the above method.

According to an embodiment of the disclosure, the disclosure provides a non-transitory storage medium. When instructions in the storage medium are executed by a processor of electronic equipment, the electronic equipment executes the above method.

BRIEF DESCRIPTION OF THE DRAWINGS

FIG. 1 is a flowchart of a method for generating an animation according to some embodiments of the present disclosure.

FIG. 2 is a diagram showing a corresponding relation between configuration files and configuration file identifiers according to some embodiments of the present disclosure.

DETAILED DESCRIPTION OF THE EMBODIMENTS

Figure 3:
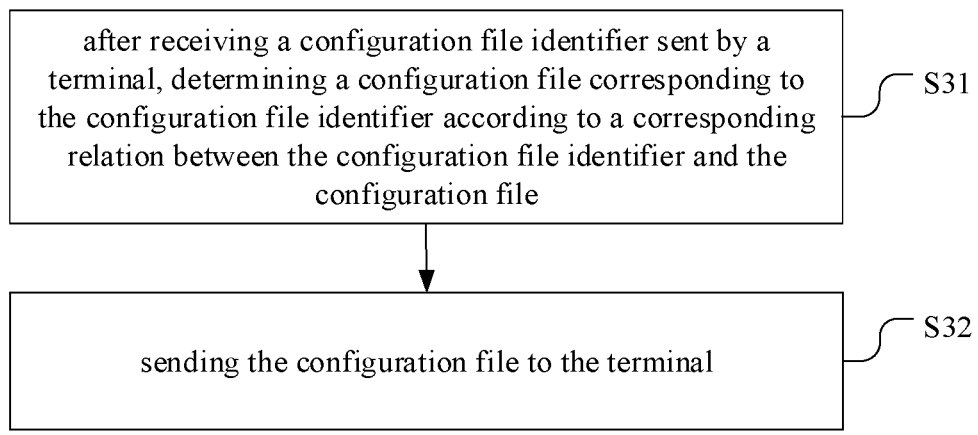
FIG. 3 is a flowchart of another method for generating an animation according to some embodiments of the present disclosure.

In order to enable those of ordinary skill in the art to better understand the schemes of the present disclosure, the schemes in the embodiments of the present disclosure will be clearly and completely described below with reference to the accompanying drawings.

It should be noted that the terms "first", "second" and the like in the specification and claims of the present disclosure and the above drawings are used to distinguish similar objects and are not necessarily used to describe a specific order or sequence. It should be understood that the data so used may be interchanged where appropriate so that the embodiments of the present disclosure described herein can be implemented in an order other than those illustrated or described herein. The implementation models described in the following exemplary embodiments do not represent all implementation models consistent with the present disclosure. On the contrary, they are merely examples of devices and methods consistent with some aspects of the present disclosure as detailed in the appended claims.

The following is an explanation of some words used herein.

1. The term "and/or" in the embodiments of the present disclosure describes the association relationship of the associated objects, indicating that there can be three kinds of relationships, for example, A and/or B can mean A alone; A and B; and B alone. The character "/" generally indicates that the two associated objects are in an "or" relationship.

2. In the embodiments of the present disclosure, the term "network side device" or "network side equipment" refers to a network server or other device that can store configuration files, such as a server corresponding to a client.

3. The term "terminal" in the embodiments of the present disclosure refers to mobile devices, including mobile phones, computers, tablets, intelligent terminals, multimedia devices, streaming media devices, digital broadcasting terminals, messaging devices, game consoles, tablet devices, medical devices, fitness devices, personal digital assistants, etc.

4. In the embodiments of the present disclosure, the term "coupling" refers to the phenomenon that two or more systems or two forms of motion influence each other and even unite through interaction. In the embodiments of the present disclosure, it refers to the coupling between various modules of software. Coupling is a measure of the correlation between various modules in a program structure, which depends on the complexity of interfaces between various modules, the way the modules are called, and which information passes through the interfaces.

5. In the embodiments of the present disclosure, the term "electronic equipment" refers to equipment consisting of an integrated circuit, a transistor, an electron tube and other electronic components and depending on electronic technology (including) software, including electronic computers, robots controlled by electronic computers, numerical control or program control systems, etc.

6. In the embodiments of the present disclosure, the term "view" refers to a visible image or group of images displayed to a user in an APP or applet.

7. In the embodiments of the present disclosure, the term "animation group" refers to grouping two or more related animations for integral control, for example, being on a loop as a whole or being triggered as a whole. The animation group cannot be copied. For example, the element itself has two animations featuring magnification and linear motion, and the two animations are synthesized into one group.

8. In the embodiments of the present disclosure, the term "WeChat Bonus" refers to the special effects on WeChat background triggered by sending specific keywords on WeChat, which makes users feel surprised and happy in the communication process.

The application scenario described in the embodiments of the present disclosure is to more clearly explain the technical solution of the embodiments of the present disclosure, and does not constitute a limitation on the technical solution provided in the embodiments of the present disclosure. Those of ordinary skill in the art know that with the emergence of new application scenarios, the technical solution provided in the embodiments of the present disclosure is also applicable to similar technical problems.

In the related art, animated behaviors and animated resources are directly written into the code in the encoding stage, animation view is assembled and animation is displayed. The animated behaviors, resources, view assembly and display are logic-coupled and completed in one place. For example, animation writing is required when developing APP. When 10 animations need to be generated, 10 times of coding of similar programs is required, and the results are directly packaged in the installation package of APP. After the APP is launched, the animation effect is fixed and cannot be modified after release. Moreover, due to animation logic coupling and no clear module division, reuse is hard to realize. When there is a new animation or an animation update, downloading an updated installation package to further update the APP is necessary.

The embodiments of the present disclosure provide a configuration-based animation component solution, which decouples animated behaviors, animated resources, animation view assembly and animation display, is flexible and configurable, and makes it easy to reuse each module. The animated behaviors and resources are abstracted as animation configuration (abstracted as a data model, defined as a set of complete animation configuration, which can be embodied in the form of configuration files). The problem of logic coupling of animated behaviors, resources and animations is solved.

FIG. 1 is a flowchart of a method for generating an animation according to some embodiments of the present disclosure. As shown in FIG. 1, the method is applied to a terminal. The method includes the following operations.

S11, acquiring a configuration file corresponding to a configuration file identifier.

S12, determining behavior information and animated resources based on the configuration file.

In some embodiments, the configuration file is analyzed according to a preset analysis rule to determine animation behavior descriptive information (namely behavior information) and animated resources.

S13, acquiring first animated resources based on first animated resource identifiers in the behavior information.

S14, generating the animation by synthesizing the behavior information and the first animated resources.

In some embodiments, the animation behavior descriptive information and the animated resources corresponding to animated resource identifiers in the animation behavior descriptive information are synthesized to obtain the animation.

In the above scheme, the animated behaviors and resources are abstracted as animation configuration, leading to logic cohesion and clear responsibilities; the configuration file needs to be obtained according to the configuration file identifier, the configuration file is analyzed according to the preset analysis rule to determine the animation behavior descriptive information and the animated resources; the animation can be obtained by synthesizing the animation behavior descriptive information and the animated resources obtained through analysis; and the same analysis rule is adopted for different configuration files for file analysis and animation synthesis to realize logic decoupling of the animated behaviors, resources and view assembly, thus facilitating the reuse of the animated behaviors, resources and view assembly for different configuration files.

According to an embodiment of the disclosure, the configuration file is generated in advance according to the data provided by an animation designer, and the pre-generated configuration file may be stored locally in the terminal or in network side equipment.

According to an embodiment of the disclosure, the configuration file contains at least one of animation behavior descriptive information, animated resources or animated resource configuration information.

According to an embodiment of the disclosure, the animated resources are generally static resources, such as pictures and audio, etc.

In some embodiments, when the animated resources are placed in the configuration file, pictures or audio needs to be added to the configuration file in the form of files, and some dynamic resources need to be downloaded elsewhere instead of the network side equipment or the terminal where the configuration file is stored, the configuration file generally contains animated resource configuration information.

The animated resource configuration information contains at least one animated resource address and an animated resource identifier corresponding to the at least one animated resource address. The animated resource identifier is used for uniquely identifying corresponding resources. The animated resource address is used to obtain the animated resources, and can be represented by uri (Uniform Resource Identifier) or can be an http (HyperText Transfer Protocol) address. For example, the animated resource configuration information can be represented by a predefined field "resource", which includes "resourceId" to represent the animated resource identifier, and "uri" to represent the animated resource address. For example, "resourceId": 1 means that the animated resource identifier is 1, and "uri": "http://www.xxx.png" means that the website for downloading the animated resources is "http://www.xxx.png".

According to an embodiment of the disclosure, the animation behavior descriptive information is used to describe how the animation moves.

According to an embodiment of the disclosure, the animation behavior descriptive information includes at least one of an animated resource identifier, start time, total duration, time function, number of cycles, motion path or animation type.

According to an embodiment of the disclosure, the animated resource identifier contained in the animation behavior descriptive information is an identifier for uniquely marking the animated resource described by the animation behavior descriptive information.

In some embodiments, the animation designer provides relevant data for describing how the animation moves (e.g., a series of behaviors such as track, duration and position), and the data are converted into the animation behavior descriptive information according to a preset conversion rule, i.e., some fields are defined to describe the animated resource identifier, start time, etc. contained in the animation behavior descriptive information, and the data provided by the animation designer are added to the corresponding field, and converted into a format corresponding to the field according to the preset conversion rule, wherein these fields can be artificially predefined. Fields that may be used and some examples are listed below.

In some embodiments, a field type is defined to indicate the animation type. Type values can include: Keyframe, Transform (transform animation, i.e. transition from state a to state b), support alpha (transparency), scale, rotation, etc. For attributes like alpha, scale and rotation, the start and end values of each attribute can be defined in the configuration file, for example, "alpha": [0, 1] refers to the transition from transparent to opaque.

According to an embodiment of the disclosure, the configuration file identifier can be represented by "configId". For example, "configId": 1 means that the configuration file identifier is 1; the start time can be represented by "startTime", such as "startTime": 0; the total duration can be represented by "duration", such as "duration": 2000, assuming that the unit is milliseconds; the number of cycles can be represented by "repeatCount", such as "repeatCount": 0; "size" can represent the size of a picture, which contains attributes such as "width" and "height", for example, "width": 100 (representing a view width of 100), "height": 100 (representing a view height of 100), and the unit can be predefined, such as millimeters.

According to an embodiment of the disclosure, the animation descriptive information may contain some definition fields about keyframe for representing keyframe animation, such as keyTimes and attribute values corresponding to the times (alpha, scale, rotation, etc.), and keyframe animation is performed on these attributes.

When defining the "keyTimes" field, a set of times can be used to represent the keyframe times, and the times are represented with relative values, relative value=current time/total duration, ranging from 0 to 1, for example, "keyTimes": [0, 0.5, 1] means that assuming the total duration is 2000 ms and the start time is 0 ms, then keyframes are set at 0 ms, 1000 ms and 2000 ms.

According to an embodiment of the disclosure, the animation descriptive information may contain some defined fields about path (which can be understood as coordinates) for representing a motion path, path: a set of coordinates, each coordinate including x, y, relative value, x=horizontal position/total view width, y=vertical position/total view height, the value range being 0-1, such as "x": 0.3, "y": 0.6; and keyframes correspond to coordinates one by one. Scale: a set of scaling (equal ratio scaling), relative value, value=width/original width, with an unlimited range of values; keyframes corresponding to scaling values one by one. Rotation and alpha are similar to scale, such as "scale": [1, 0.5, 1], "rotation": [0.5, −0.2, 0], "alpha": [0, 0.5, 1].

In some embodiments, the path, scale, rotation and alpha are attributes that need to be animated. Each attribute is configured with a set of attribute values. The number of attribute values is the same as the number of keyframes, indicating the attribute values corresponding to each keyframe.

According to an embodiment of the disclosure, the preset conversion rule corresponds to the preset analysis rule. For example, if the preset conversion rule stipulates that the "startTime" field indicates the start time, when the configuration file is analyzed according to the preset analysis rule, the "startTime" field in the configuration file also indicates the start time.

In some embodiments, when the animation behavior descriptive information contains at least one piece of animation sub-behavior descriptive information (namely sub-behavior information), the animated resource identifier, start time, total duration and time function contained in the animation sub-behavior descriptive information can be defined in "sublayers", and correspondingly, fields like "startTime" and "duration" can be included in "sublayers".

In the embodiments of the present disclosure, each configuration file has a configuration file identifier, which is used to uniquely identify the configuration file. The terminal acquires the configuration file through the configuration file identifier, provided that the terminal first determines the configuration file identifier of the configuration file to be acquired.

FIG. 2 shows the corresponding relation between configuration file identifiers and configuration files according to the embodiments of the present disclosure. The terminal or network side equipment can determine the configuration file according to the corresponding relation, wherein configId represents the configuration file identifier, and profile represents the configuration file.

According to an embodiment of the disclosure, there are many methods for terminal side equipment (e.g., clients and tablets) to determine the configuration file identifier.

In some embodiments, the configuration file identifier is determined by the terminal based on an input instruction.

According to an embodiment of the disclosure, when the user selects an animation to be displayed, a corresponding instruction will be input. The terminal determines the configuration file identifier after determining the input instruction, that is, determines the configuration file identifier of the animation according to the corresponding relation between the configuration file identifier and the configuration file.

In some embodiments, the input instruction may be an instruction triggered by the user's selection of the animation to be displayed, and the terminal determines the animation selected by the user to be displayed, for example, a configuration file with id=1 corresponds to the "like" animation and a configuration file with id=2 corresponds to the "follow" animation.

According to an embodiment of the disclosure, the input instruction may be some keywords input by the user, such as "XOXO" and "Happy Birthday". When the user inputs a certain keyword, the terminal can determine the configuration file identifier of the animation corresponding to the keyword.

In some embodiments, the configuration file identifier is sent by the network side equipment.

It should be noted that the methods listed in the embodiments of the present disclosure for the terminal to determine the configuration file identifier are only examples, and any method for the terminal to determine the configuration file identifier is applicable to the embodiments of the present disclosure.

In the embodiments of the present disclosure, there are many ways to trigger the network side equipment to issue the configuration file identifier to the terminal. In some embodiments, when the network side equipment determines that there is a new configuration file, the network side equipment is triggered to issue the configuration file identifier to the terminal.

According to an embodiment of the disclosure, when determining that there is a new configuration file, the network side equipment determines the configuration file identifier of the new configuration file, and sends the configuration file identifier to the terminal.

Take "WeChat Bonus" as an example. "WeChat Bonus" is not fixed. The WeChat team sends new bonuses to users according to hot events on special days, hoping to bring a little surprise to users without disturbing them. In this case, when determining that there is a new configuration file (e.g., a configuration file of a newly released bonus), the network side equipment determines the configuration file identifier of the new configuration file, sends the configuration file identifier to the terminal, and adds the corresponding relation between the new configuration file and the configuration file identifier to the current corresponding relation list, for example, to the list shown in FIG. 2.

In some embodiments, when the network side equipment determines that there is a configuration file update, the network side equipment is triggered to issue the configuration file identifier to the terminal.

When determining that there is a configuration file update, the network side equipment determines the configuration file identifier of the updated configuration file and sends the configuration file identifier to the terminal. For example, when the WeChat team wants to adjust the animation corresponding to a certain keyword, the network side equipment determines that there is an updated configuration file.

In the embodiments of the present disclosure, there are two main ways for the terminal to acquire the configuration file corresponding to the configuration file identifier.

In some embodiments, the terminal determines the configuration file stored locally according to the configuration file identifier.

In this acquisition method, the terminal stores configuration files locally. FIG. 2 is a diagram of the corresponding relation between configuration files and configuration file identifiers in the embodiments of the present disclosure, which is embodied in the form of a list. It can be seen from FIG. 2 that the configuration file corresponding to the configuration file identifier ConfigId: 1 is Profile1, and the configuration file identifier corresponding to Profile2 is ConfigId: 2, etc. When the terminal acquires the locally stored configuration file, the configuration file corresponding to the configuration file identifier can be determined by looking up the table.

In some embodiments, the terminal acquires the configuration file issued by the network side equipment.

In this acquisition method, the configuration file is stored in the network side equipment (e.g., a server), the terminal sends a request containing the configuration file identifier to the network side equipment, and the network side equipment sends the configuration file to the server after determining the configuration file requested by the terminal according to the corresponding relation between the configuration file and the configuration file identifier.

The network side equipment can also determine the configuration file by looking up the table, and the specific determination method is similar to that of the terminal. For example, in the table shown in FIG. 2, assuming that the configuration file identifiers included in the request sent by the terminal to the network side equipment are ConfigId: 3 and 4, the configuration files sent by the network side equipment to the terminal are: Profile3 and Profile4.

FIG. 3 is a flowchart of an animation synthesis method according to an exemplary embodiment. As shown in FIG. 3, the animation synthesis method is applied to network side equipment and includes the following steps.

S31, after a configuration file identifier sent by a terminal is received, a configuration file corresponding to the configuration file identifier is determined according to a corresponding relation between the configuration file identifier and the configuration file.

S32, the configuration file is sent to the terminal.

According to the method, animation configuration can be issued through a server interface, the server can update the configuration file and issue the updated configuration file to the terminal, so that the problem that an animation cannot be modified after an APP is released can be solved, and the animation can be defined in codes due to the compatibility with the existing solution.

In the embodiments of the present disclosure, if the network side equipment determines that there is a new configuration file or configuration file update, the new configuration file or the updated configuration file can also be directly issued to the terminal.

According to an embodiment of the disclosure, the terminal sends a request to the network side equipment through an API (Application Program Interface). There are many ways to trigger the terminal to send a request containing a configuration file identifier to the network side equipment, depending on specific scenarios.

In some embodiments, the scenario may be that the terminal sets a time in advance, and sends a request to the network side equipment according to the preset time. For example, when the APP starts or when the APP returns from the background to the foreground, the terminal can request the network side equipment to issue the configuration file. If there are few animations that can be displayed by the client APP itself, the terminal can request all configuration files from the network side equipment at one time by sending the configuration file identifiers of animations that can be displayed by the terminal (client APP).

In some embodiments, the scenario may be that the terminal sends a request to the network side equipment immediately after determining the configuration file identifier of the animation according to the input instruction or after receiving the configuration file identifier sent by the network side equipment. For example, when the user gives a "like", the terminal requests the configuration file corresponding to liking the animation from the server through an interface (the determined configuration file identifier is sent to the server through the request), which is done in real time and suitable for some instant messaging software, such as WeChat and QQ.

When the configuration file in the server is updated, the request result returned by the server (that is, the configuration file) will change, so that the server configuration update can take effect in real time. In this case, the user does not need to update the APP, and can directly display the new animation or updated animation according to the configuration file issued by the server, which is flexible, can achieve modification easily, and solves the problem that the animation effect cannot be modified after releasing.

In some embodiments, if the animation behavior descriptive information contains at least one piece of animation sub-behavior descriptive information, the animation behavior descriptive information and the at least one piece of animation sub-behavior descriptive information form a tree structure relation, that is, one piece of animation behavior descriptive information can contain both basic information (such as the above-mentioned animated resource identifier, start time, total duration, etc.) and multiple pieces of animation sub-behavior descriptive information.

Figure 4:
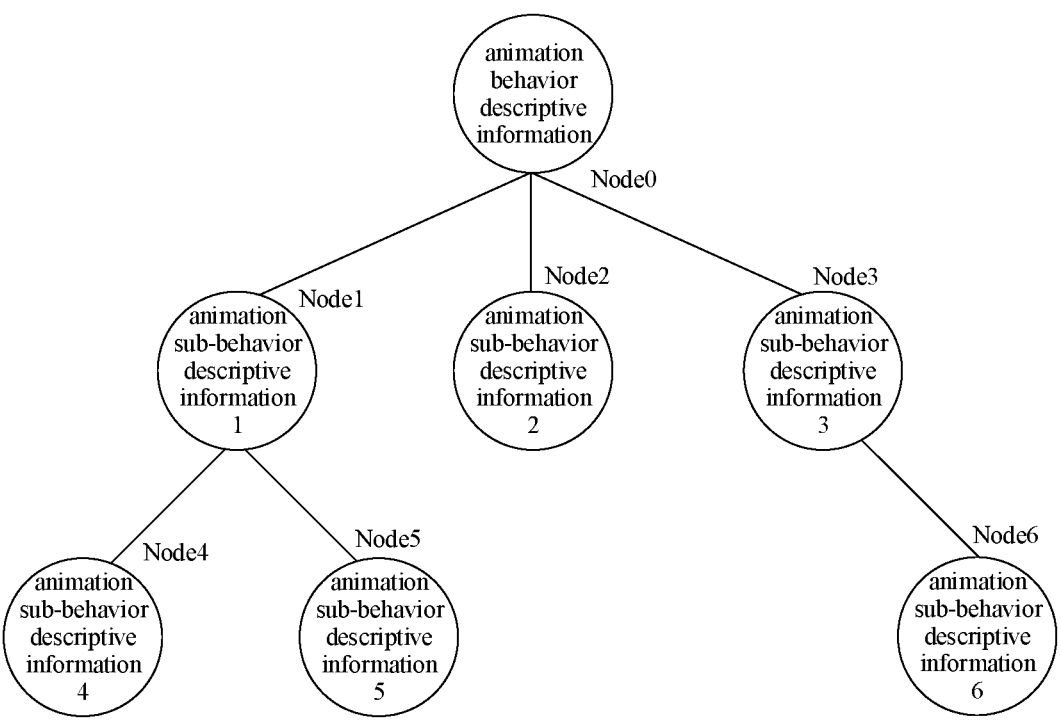
FIG. 4 is a diagram of a tree structure according to some embodiments of the present disclosure.

FIG. 4 is a possible diagram of a tree structure relation between animation behavior descriptive information and animation sub-behavior descriptive information according to the embodiments of the present disclosure. Node0 represents the animation behavior descriptive information and is located in the trunk of the tree structure. As can be seen from the figure, Node0 also includes three sub-nodes, namely Node1, Node2 and Node3, which are located in the branches of the tree structure. The three sub-nodes respectively correspond to three pieces of animation sub-behavior descriptive information, wherein Node1 also includes two sub-nodes, namely Node4 and Node5, corresponding to animation sub-behavior descriptive information 4 and animation sub-behavior descriptive information 5 respectively, and the animation sub-behavior descriptive information 4 and the animation sub-behavior descriptive information 5 are located in the animation sub-behavior descriptive information 1; similarly, Node3 also includes a sub-node, namely Node6, corresponding to animation sub-behavior descriptive information 6.

In the embodiments of the present disclosure, each piece of animation (sub) behavior descriptive information contains an animated resource identifier, and each animated resource identifier corresponds to animated resources. According to the animation (sub) behavior descriptive information, the animated resources corresponding to the animated resource identifier can be converted to obtain an animation layer. As shown in the tree structure diagram in FIG. 4, each node corresponds to a layer, and the depth of the node corresponds to the depth of the corresponding layer in the picture. The nodes form a parent-child relation according to the visual relation. A child node of a node means that the child node is in front of the node. Node0 represents the root node and can represent a window or the entire screen according to the actual situation. Node0-Node6 correspond to layer 0-layer 6 respectively. Node1, Node2 and Node3 are child nodes of Node0, Node4 and Node5 are child nodes of Node1, and Node6 is the child node of Node3.

In the embodiments of the present disclosure, when the animation behavior descriptive information includes at least one piece of animation sub-behavior descriptive information, the animation behavior descriptive information and the animated resources corresponding to the animated resource identifier included in the animation behavior descriptive information need to be synthesized according to a preset synthesis rule to obtain an animation.

In some embodiments, when converting the animated resources to generate animation layers according to the animation (sub) behavior descriptive information, depth-first traversal of the animation behavior descriptive information of the tree structure is conducted (for example, according to the order of Node0-Node1-Node2-Node3-Node4-Node5-Node6), and for each piece of animation (sub) behavior descriptive information, the corresponding animated resources are converted into an animation layer according to basic information such as start time, duration and path. The depths of Node1, Node2 and Node3 are the same and the order thereof can be interchanged. Similarly, the depths of Node4, Node5 and Node6 are the same and the order thereof can be interchanged.

In some embodiments, the animated resource identifiers (resourceId) in the animation behavior descriptive information 0 and the animation sub-behavior descriptive information 1 to 6 are respectively: resouceId0-resouceId6, and the animated resources corresponding to the seven animated resource identifiers are respectively picture 0 to picture 6, during animation synthesis, picture 0 is converted into a first animation layer 0 according to the animation behavior descriptive information 0, picture 1 is converted into a second animation layer 1 according to the animation sub-behavior descriptive information 1, picture 2 is converted into a second animation layer 2 according to the animation sub-behavior descriptive information 2, and so on.

Then the first animation layer 0 and the second animation layers 1 to 6 are synthesized into an animation group according to the tree structure relation between the animation behavior descriptive information 0 and the animation sub-behavior descriptive information 1 to 6 and the preset synthesis rule, and the animation is displayed through the animation group.

The positional relation between animation layers can be determined according to the preset synthesis rule and the relation between the behavior descriptive information, so as to synthesize the layers. For the tree structure relation shown in FIG. 4, layer 1, layer 2 and layer 3 are located before layer 0, layer 4 and layer 5 are located before layer 1, and layer 6 is located before layer 3.

Figure 5A:
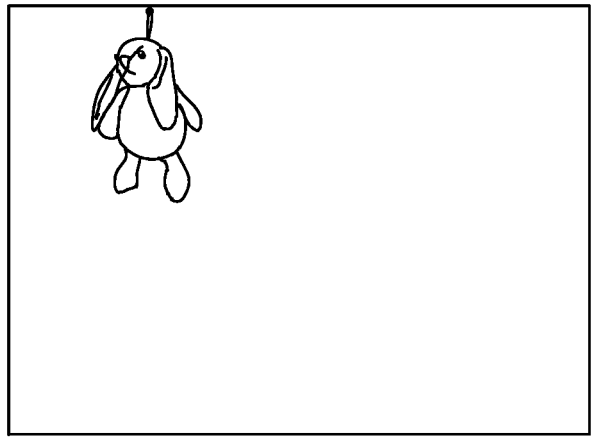
FIG. 5A is a diagram of a first layer according to some embodiments of the present disclosure.
Figure 5B:
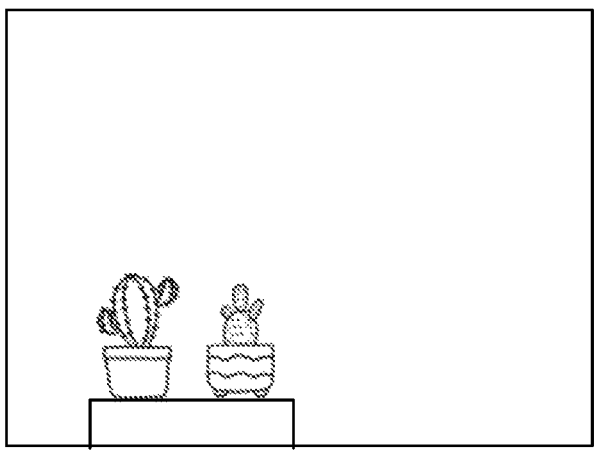
FIG. 5B is a diagram of a first type of second layer according to some embodiments of the present disclosure.
Figure 5C:
FIG. 5C is a diagram of a second type of second layer according to some embodiments of the present disclosure.
Figure 5D:
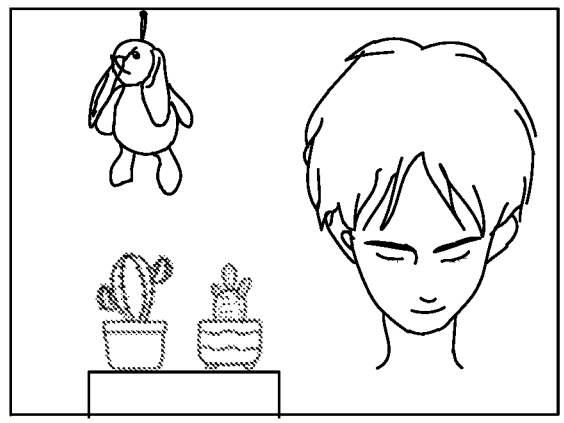
FIG. 5D is a diagram of a synthesized animation according to some embodiments of the present disclosure.

The effect of animation synthesis is shown below in a simple structure. Assuming that the animation behavior descriptive information includes two pieces of animation sub-behavior descriptive information, the generated first animation layer is shown in FIG. 5A, and the generated second animation layer is shown in FIG. 5B and FIG. 5C. The outermost rectangular frame in the three figures identifies the size of the view, and the positions of the rabbit, plants and person shown in the figures can be determined according to the animation behavior descriptive information. Motion behaviors (including motion trajectory, duration, etc.) can be synthesized to obtain the diagram shown in FIG. 5D (since there is no way to display it dynamically, FIG. 5D shows the animation synthesis result in the form of a picture).

In the embodiments of the present disclosure, when determining the animated resources corresponding to the animated resource identifier contained in the animation (sub) behavior descriptive information, the animated resources whose animated resource identifier is identical to the animated resource identifier contained in the behavior descriptive information is used as the animated resources corresponding to the animated resource identifier contained in the animation (sub) behavior descriptive information.

According to an embodiment of the disclosure, after animation synthesis is finished according to the preset synthesis rule, the synthesized animation can be displayed immediately, or the synthesized animation can be saved to the terminal first and displayed after receiving a play request from the user.

Figure 6A:
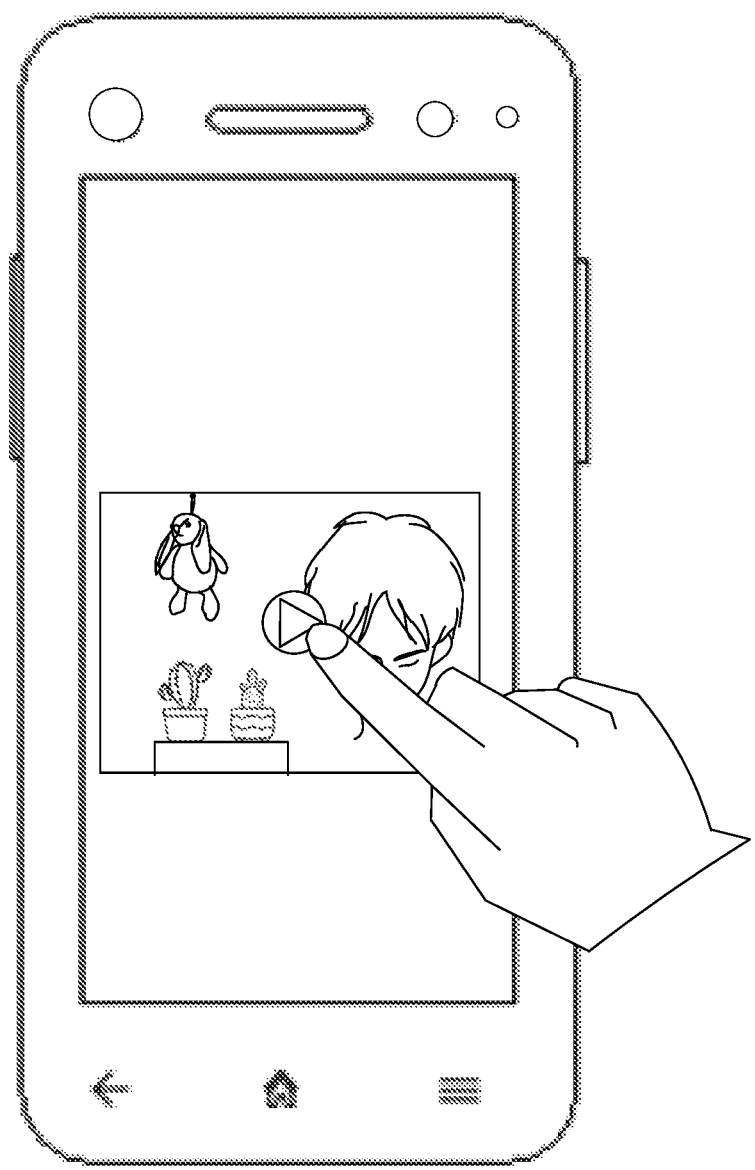
FIG. 6A is a diagram of a first animation presentation according to some embodiments of the present disclosure.
Figure 6B:
FIG. 6B is a diagram of a second animation presentation according to some embodiments of the present disclosure.

As shown in FIG. 6A, there is a play button on the animation display interface, and the user can play the animation by clicking the play button. As shown in FIG. 6B which is a diagram of animation display according to an embodiment of the present disclosure, it shows that the animation is being played, the user can pause the animation by clicking the rectangular icon shown in the lower left corner of the figure, or adjust the playing content by dragging the time bar.

Figure 6C:
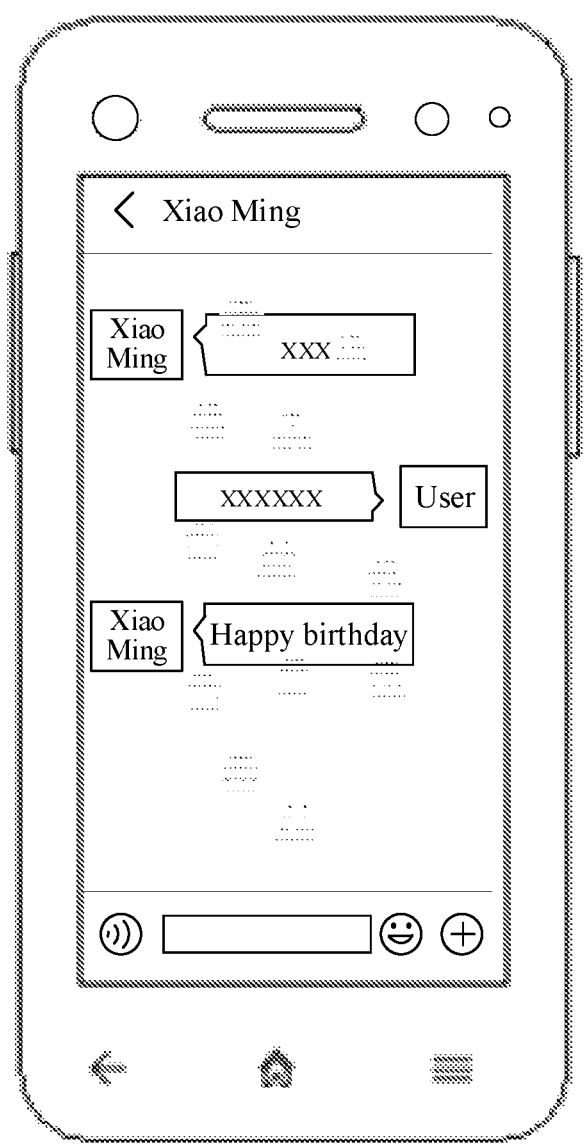
FIG. 6C is a diagram of a third animation presentation according to some embodiments of the present disclosure.

FIG. 6C is a diagram of a common animation appearing during chatting provided by an embodiment of the present disclosure. It shows that an animation is displayed after Xiaoming inputs "Happy birthday". The animation shown in FIG. 6C has a two-level structure, including animation behavior descriptive information and multiple pieces of animation sub-behavior descriptive information, where the animation sub-behavior descriptive information is used to represent the animated behaviors of cupcakes, such as the position and track of a cupcake, and the animation behavior descriptive information is used to represent the animated behaviors of the whole animation, such as the duration of the whole animation and the display effect (for example, the cupcakes drop from the top of the interface, or the cupcakes float from the left side of the interface to the right side).

Figure 7:
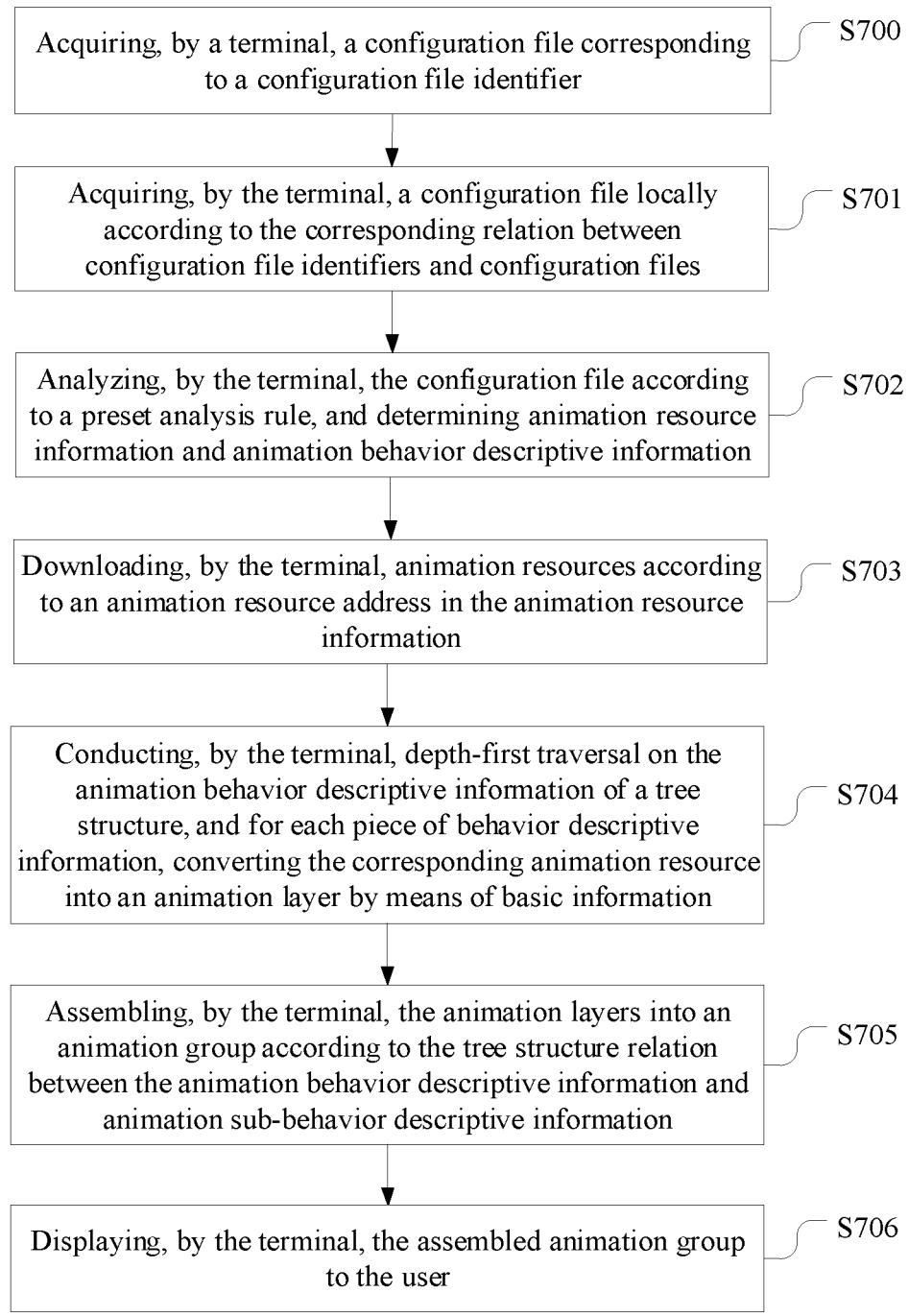
FIG. 7 is a flowchart of a complete method of animation synthesis and display according to some embodiments of the present disclosure.

FIG. 7 is a flowchart of a complete method of animation synthesis according to the embodiments of the present disclosure. The method includes the following steps.

S700: a terminal determines a configuration file identifier selected by a user.

S701: the terminal acquires a configuration file locally according to the corresponding relation between configuration file identifiers and configuration files.

S702: the terminal analyzes the configuration file according to a preset analysis rule, and determines animated resource information and animation behavior descriptive information.

S703: the terminal downloads animated resources according to an animated resource address in the animated resource information.

S704: the terminal conducts depth-first traversal on the animation behavior descriptive information of a tree structure, and for each piece of behavior descriptive information, converts the corresponding animated resources into an animation layer by means of basic information.

S705: the terminal assembles the animation layers into an animation group according to the tree structure relation between the animation behavior descriptive information and animation sub-behavior descriptive information.

S706: the terminal displays the assembled animation group to the user.

The behavior descriptive information mentioned in S704 can refer to the animation behavior descriptive information corresponding to the trunk of the tree structure or the animation sub-behavior descriptive information corresponding to the branches of the tree structure. Taking the tree structure shown in Figure X as an example, each piece of behavior descriptive information in S704 refers to the animation behavior descriptive information corresponding to Node0-Node6.

Figure 8:
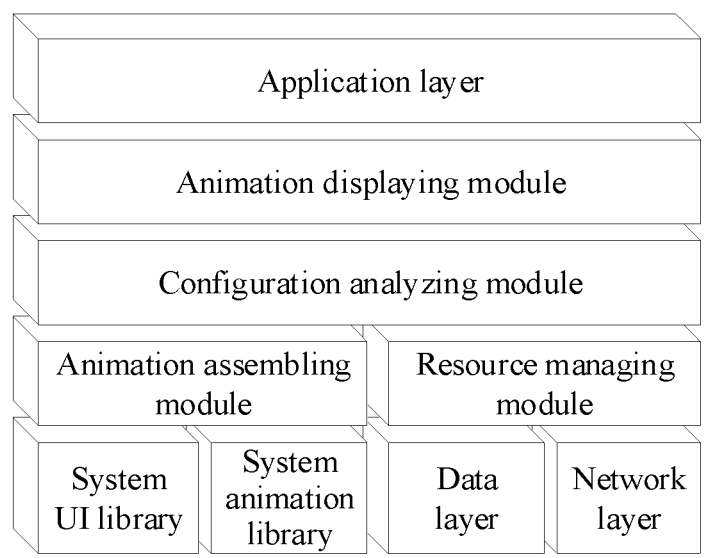
FIG. 8 is a frame diagram of a device for generating an animation according to some embodiments of the present disclosure.

FIG. 8 is a diagram of a device for generating an animation according to the embodiments of the present disclosure. As shown in FIG. 8, the device includes a configuration analyzing module, a resource managing module, an animation assembling module and an animation displaying module.

The configuration analyzing module is responsible for animation configuration analysis. After inputting a configuration file obtained by a terminal into the configuration analyzing module, the configuration file is analyzed according to a preset analysis rule to determine animation behavior descriptive information and animated resources, then the resource managing module is called to download the animated resources (i e animated resources, usually pictures or audio files), then the animation assembling module is called for animation assembly, and finally an assembled animation view is output.

The resource managing module is responsible for downloading, storing and obtaining the animated resources (picture files etc.). The resource managing module provides external resource downloading and acquiring interfaces, so as to input resource addresses, download and store the animated resources, and output the animated resources.

The animation assembling module is responsible for the assembly of an animation view. The animation behavior descriptive information and the animated resources obtained after analyzing the configuration file are input, a system UI library and a system animation library are called according to the animation behavior descriptive information and the animated resources, and system UI components and system animation components are assembled into the animation view. The assembled animation view is output.

The animation displaying module is responsible for animation display. The assembled animation view is input, and external animation playing control interfaces such as start and pause are provided for animation display, as shown in FIG. 6A and FIG. 6B.

Figure 9:
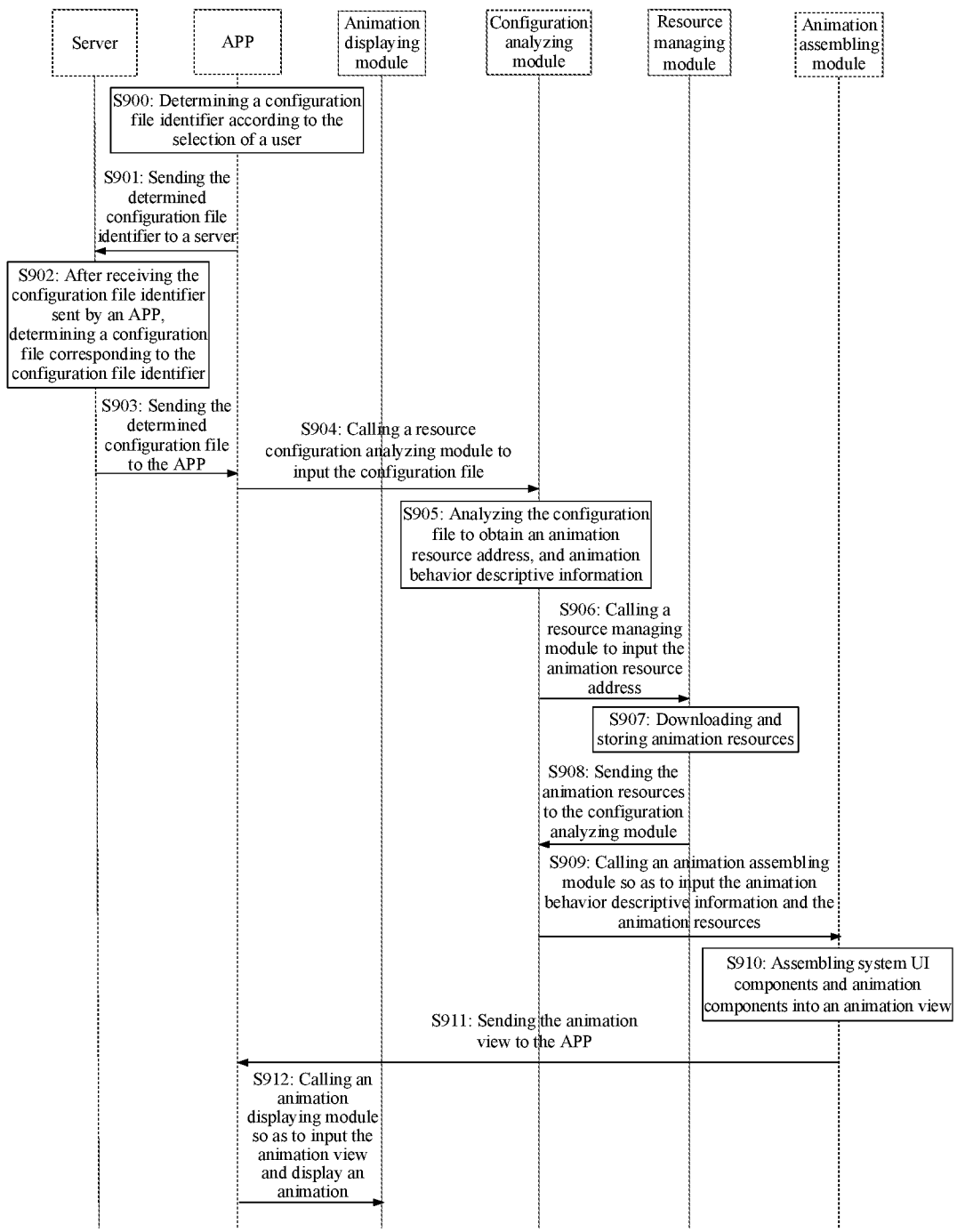
FIG. 9 is a flowchart of another complete method of animation synthesis and display according to some embodiments of the present disclosure.

FIG. 9 is a flowchart of a complete method of animation synthesis and display according to the embodiments of the present disclosure. The execution steps of the method are assigned to specific modules, referring to the modules shown in FIG. 8. The method specifically includes the following steps.

S900: an APP determines a configuration file identifier according to the selection of a user.

S901: the APP sends the determined configuration file identifier to a server.

S902: after receiving the configuration file identifier sent by the APP, the server determines a configuration file corresponding to the configuration file identifier.

S903: the server sends the determined configuration file to the APP.

S904: the APP calls a resource configuration analyzing module to input the configuration file.

S905: the configuration analyzing module analyzes the configuration file to obtain an animated resource address, and animation behavior descriptive information.

S906: the configuration analyzing module calls a resource managing module to input the animated resource address.

S907: the resource managing module downloads and stores animated resources.

S908: the resource managing module sends the animated resources to the configuration analyzing module.

S909: the configuration analyzing module calls an animation assembling module so as to input the animation behavior descriptive information and the animated resources.

S910, the animation assembling module assembles system UI components and animation components into an animation view.

S911, the animation assembling module sends the animation view to the APP.

S912, the APP calls an animation displaying module so as to input the animation view and display an animation.

Figure 10:
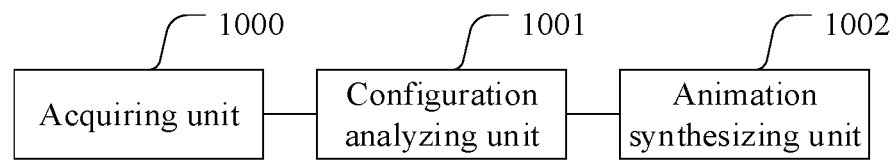
FIG. 10 is a block diagram of a device for generating an animation according to some embodiments of the present disclosure.

FIG. 10 is a block diagram of a device for generating an animation according to the embodiments of the present disclosure. Referring to FIG. 10, the device includes an acquiring unit 1000, a configuration analyzing unit 1001 and an animation synthesizing unit 1002.

The acquiring unit 1000 is configured to acquire a configuration file corresponding to a configuration file identifier.

The configuration analyzing unit 1001 is configured to analyze the configuration file based on a preset analysis rule to determine animation behavior descriptive information and animated resources.

The animation synthesizing unit 1002 is configured to acquire first animated resources based on first animated resource identifiers in the animation behavior descriptive information, and generated the animation by synthesizing the animation behavior descriptive information and the first animated resources.

According to an embodiment of the disclosure, the configuration file identifier is determined based on an input instruction or is sent by a network side device.

According to an embodiment of the disclosure, the configuration analyzing unit 1001 is further configured to: acquire the configuration file based on a corresponding relation between the configuration file identifier and the configuration file in response to the configuration file identifier is determined based on the input instruction; or receive the configuration file sent by the network side device in response to the configuration file identifier is sent by the network side device. The configuration file is determined by the network side device based on a corresponding relation between the configuration file identifier and the configuration file.

According to an embodiment of the disclosure, the configuration analyzing unit 1001 is further configured to: determine configuration information of the animated resources by analyzing the configuration file based on the preset analysis rule, where the configuration information includes at least one animated resource address and second animated resource identifiers corresponding to the at least one animated resource address; download the animated resources based on the at least one animated resource address.

According to an embodiment of the disclosure, the configuration analyzing unit 1001 is further configured to: determine third animated resource identifiers of animated resources downloaded based on the animated resource address based on second animated resource identifiers corresponding to the animated resource address.

According to an embodiment of the disclosure, the animation synthesizing unit 1002 is further configured to: convert the first animated resources into first animation layers; convert second animated resources into second animation layers, where the second animated resources corresponds to fourth animated resource identifiers included in sub-behavior information, and the sub-behavior information is at least a part of the behavior information; and generate an animation group by synthesizing the first animation layers and the second animation layers based on a tree structure relation between the behavior information and the sub-behavior information.

Figure 11:
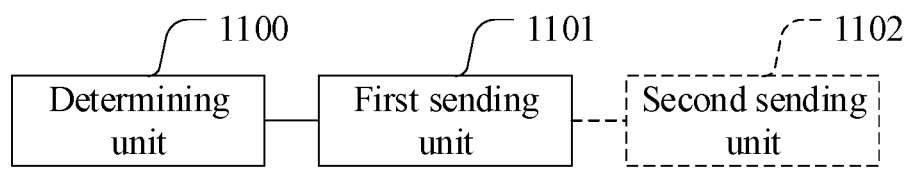
FIG. 11 is a block diagram of another device for generating an animation according to some embodiments of the present disclosure.

FIG. 11 is a block diagram of an animation synthesis device according to an exemplary embodiment. Referring to FIG. 11, the device includes a determining unit 1100 and a first sending unit 1101.

The determining unit 1100 is configured to, receive a configuration file identifier sent by a terminal, determine a configuration file based on a corresponding relation between the configuration file identifier and the configuration file.

The first sending unit 1101 is configured to send the configuration file to the terminal to enable the terminal to acquire the configuration file corresponding to the configuration file identifier; determine animation behavior descriptive information and animated resources by analyzing the configuration file based on a preset analysis rule; acquire first animated resources based on first animated resource identifiers in the animation behavior descriptive information; and generate an animation by synthesizing the animation behavior descriptive information and the first animated resources.

According to an embodiment of the disclosure, the device further includes a second sending unit 1102.

The second sending unit 1102 is configured to, after determining that there is a new configuration file, determine a configuration file identifier of the new configuration file, and send the configuration file identifier to the terminal; or after determining that there is a configuration file update, determine a configuration file identifier of the updated configuration file, and send the configuration file identifier to the terminal.

For the device in the above embodiments, the specific request executing manner of each unit has been described in detail in the method embodiments, and will not be described in detail here.

Figure 12:
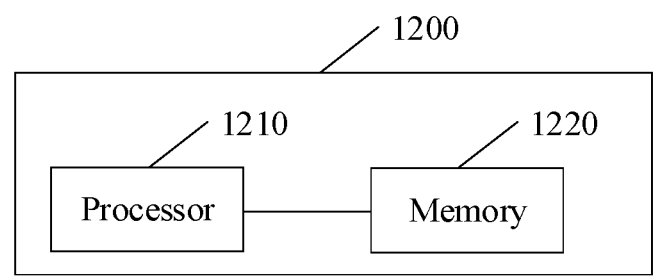
FIG. 12 is a block diagram of electronic equipment according to some embodiments of the present disclosure.

FIG. 12 is a block diagram of electronic equipment 1200 for animation synthesis according to an exemplary embodiment, including: a processor 1210; and a memory 1220 for storing processor 1210 executable instructions; where the processor 1210 is configured to execute the instructions to implement any animation synthesis method applied to a terminal in the embodiments of the present disclosure.

According to an embodiment of the disclosure, a storage medium including instructions is provided, such as a memory 1220 including instructions, which can be executed by the processor 1210 of the electronic equipment 1200 to complete the above method. Alternatively, the storage medium may be a non-transitory computer-readable storage medium. For example, the non-transitory computer readable storage medium may be a ROM, a Random Access Memory (RAM), a CD-ROM, a magnetic tape, a floppy disk, an optical data storage device, etc.

Figure 13:
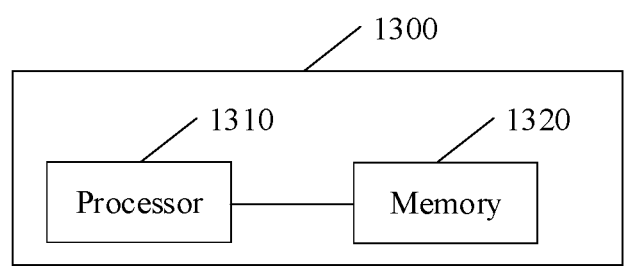
FIG. 13 is a block diagram of another electronic equipment according to some embodiments of the present disclosure.
Figure 14:
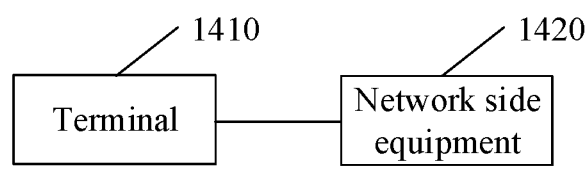
FIG. 14 is a diagram of a system for generating an animation according to some embodiments of the present disclosure.

FIG. 13 is a block diagram of electronic equipment 1300 for animation synthesis according to an exemplary embodiment, including: a processor 1310; and a memory 1320 for storing processor 1310 executable instructions; where the processor 1310 is configured to execute the instructions to implement any animation synthesis method applied to network side equipment in the embodiments of the present disclosure.

According to an embodiment of the disclosure, a storage medium including instructions is provided, such as a memory 1320 including instructions, which can be executed by the processor 1310 of the electronic equipment 1300 to complete the above method. Alternatively, the storage medium may be a non-transitory computer-readable storage medium. For example, the non-transitory computer readable storage medium may be a ROM, a Random Access Memory (RAM), a CD-ROM, a magnetic tape, a floppy disk, an optical data storage device, etc.

The embodiments of the present disclosure also provide an animation synthesis system, including a terminal 1410 and network side equipment 1420.

The terminal 1410 is used for acquiring the configuration file corresponding to the configuration file identifier; analyzing the configuration file according to a preset analysis rule to determine animation behavior descriptive information and animated resources; and synthesizing the animation behavior descriptive information and the animated resources corresponding to the animated resource identifier contained in the animation behavior descriptive information to obtain an animation.

The network side equipment 1420 is used for, after receiving the configuration file identifier sent by the terminal, determining a configuration file corresponding to the configuration file identifier according to a corresponding relation between the configuration file identifier and the configuration file; and sending the configuration file to the terminal.

The embodiments of the present disclosure also provide a computer program product, and when the computer program product is run on electronic equipment, the electronic equipment executes any animation synthesis method applied to a terminal according to the embodiments of the present disclosure or any method possibly involved in any animation synthesis method.

The embodiments of the present disclosure also provide a computer program product, and when the computer program product is run on electronic equipment, the electronic equipment executes any animation synthesis method applied to network side equipment according to the embodiments of the present disclosure or any method possibly involved in any animation synthesis method.

Other embodiments of the present disclosure will readily occur to those skilled in the art upon consideration of the specification and practice of the disclosure disclosed herein. The present disclosure is intended to cover any variation, use or adaptation of the present disclosure, which follows the general principles of the present disclosure and includes common knowledge or conventional technical means in the technical field not disclosed in the present disclosure. The specification and embodiments are to be considered as exemplary only, with the true scope and spirit of the disclosure being indicated by the following claims.

It should be understood that the disclosure is not limited to the precise structure already described above and shown in the drawings, and various modifications and changes may be made without departing from the scope thereof. The scope of the disclosure is limited only by the appended claims.

What is claimed is:

1. A method for generating an animation, comprising:
acquiring a configuration file corresponding to a configuration file identifier;
determining behavior information and a plurality of animated resources based on the configuration file;
acquiring first animated resources from the plurality of animated resources based on first animated resource identifiers in the behavior information; and
generating the animation by synthesizing the behavior information and the first animated resources;
wherein said generating the animation comprises:
converting the first animated resources into first animation layers;
converting second animated resources into second animation layers, wherein the second animated resources corresponds to fourth animated resource identifiers comprised in sub-behavior information and the sub-behavior information is at least a part of the behavior information; and
generating an animation group by synthesizing the first animation layers and the second animation layers based on a tree structure relation between the behavior information and the sub-behavior information.

2. The method according to claim 1, wherein the configuration file identifier is determined based on an input instruction, or the configuration file identifier is sent by a network side device.

3. The method according to claim 2, wherein said acquiring the configuration file corresponding to the configuration file identifier comprises:
acquiring the configuration file based on a corresponding relation between the configuration file identifier and the configuration file in response to that the configuration file identifier is determined based on the input instruction; or
receiving the configuration file sent by the network side device in response to that the configuration file identifier is sent by the network side device, wherein the configuration file is determined by the network side device based on a corresponding relation between the configuration file identifier and the configuration file.

4. The method according to claim 1, wherein said determining the plurality of animated resources comprises:
determining configuration information of the plurality of animated resources, wherein the configuration information comprises at least one animated resource address and second animated resource identifiers; and
downloading the plurality of animated resources based on the at least one animated resource address.

5. The method according to claim 4, further comprising:
determining third animated resource identifiers of the plurality of animated resources downloaded based on the at least one animated resource address based on the second animated resource identifiers corresponding to the at least one animated resource address.

6. A non-transitory storage medium, wherein when instructions in the storage medium are executed by a processor of electronic equipment, the electronic equipment executes the method according to claim 1.

7. A device for generating an animation, comprising a memory and at least one processor, wherein the at least one processor is configured to read and execute instructions stored in the memory to:
acquire a configuration file corresponding to a configuration file identifier;
determine behavior information and a plurality of animated resources based on the configuration file;
acquire first animated resources from the plurality of animated resources based on first animated resource identifiers in the behavior information; and
generate the animation by synthesizing the behavior information and the first animated resources;
wherein the at least one processor is further configured to read and execute instructions stored in the memory to:
convert the first animated resources into first animation layers;
convert second animated resources into second animation layers, wherein the second animated resources corresponds to fourth animated resource identifiers comprised in sub-behavior information, and the sub-behavior information is at least a part of the behavior information; and
generate an animation group by synthesizing the first animation layers and the second animation layers based on a tree structure relation between the behavior information and the sub-behavior information.

8. The device according to claim 7, wherein the configuration file identifier is determined based on an input instruction, or the configuration file identifier is sent by a network side device.

9. The device according to claim 8, wherein the at least one processor is further configured to read and execute instructions stored in the memory to:
acquire the configuration file based on a corresponding relation between the configuration file identifier and the configuration file in response to the configuration file identifier is determined based on the input instruction; or
receive the configuration file sent by the network side device in response to the configuration file identifier is sent by the network side device, wherein the configuration file is determined by the network side device based on a corresponding relation between the configuration file identifier and the configuration file.

10. The device according to claim 7, wherein the at least one processor is further configured to read and execute instructions stored in the memory to:
determine configuration information of the plurality of animated resources, wherein the configuration information comprises at least one animated resource address and second animated resource identifiers; and
download the plurality of, animated resources based on the at least one animated resource address.

11. The device according to claim 10, wherein the at least one processor is further configured to read and execute instructions stored in the memory to:
determine third animated resource identifiers of the plurality of animated resources downloaded based on the at least one animated resource address based on the second animated resource identifiers corresponding to the at least one animated resource address.

* * * * *